United States Patent [19]
Weihrauch et al.

[11] Patent Number: 6,055,735
[45] Date of Patent: May 2, 2000

[54] DEVICE TO MEASURE BOLT PATTERNS OF WHEEL RIMS AND AXLES

[76] Inventors: Gary E. Weihrauch, 12662 TR 152, Arlington, Ohio 45814; Dennis B. Waxler, 2501 Springmill Rd., Findlay, Ohio 45840

[21] Appl. No.: 09/097,716

[22] Filed: Jun. 16, 1998

Related U.S. Application Data

[60] Provisional application No. 60/052,776, Jul. 1, 1997.
[51] Int. Cl.[7] .............................. G01B 5/00; G01D 21/00
[52] U.S. Cl. ............................................. 33/203; 33/203.18
[58] Field of Search ................... 33/1 SB, 1 SD, 33/203, 203.18, 600

[56] References Cited

U.S. PATENT DOCUMENTS

| | | | |
|---|---|---|---|
| 3,361,482 | 1/1968 | Stevens | 33/203 |
| 4,129,950 | 12/1978 | Weinhaus et al. | 33/203.18 |
| 4,730,399 | 3/1988 | Campbell | 33/203 |
| 5,101,569 | 4/1992 | Watkins | 33/203 |
| 5,174,032 | 12/1992 | Beck | 33/203 |

*Primary Examiner*—Randy W. Gibson
*Attorney, Agent, or Firm*—Richard C. Litman

[57] ABSTRACT

A combination tool which enables a mechanic and even a layman to accurately and quickly obtain measurements of the bolt patterns of a vehicle's axle studs and any wheel rim's bolt holes in either British or metric system units. Two circular plates rotate in opposite directions in response to three pegs which slide in slots. A scale on an edge enables a user to determine whether the bolt and rim hole patterns are symmetrical and to obtain accurate measurements for quickly identifying the proper replacement wheel axle or wheel rim.

8 Claims, 5 Drawing Sheets ically but irregularly. Two wing nut bolts mounted in these slots provide the location of one lug hole relative to the center of the wheel and the location of a second lug hole opposite to the first lug hole. An elongated radial slot is provided as a ruler with markings for metric and English units. However, there is no provision for measuring three lug holes at one time and for measuring axle studs.

DEVICE TO MEASURE BOLT PATTERNS OF WHEEL RIMS AND AXLES

CROSS-REFERENCE TO RELATED APPLICATION

This application claims the benefit of U.S. Provisional Patent Application Ser. No. 60/052,776, filed Jul. 1, 1997.

BACKGROUND OF THE INVENTION

1. Field of the Invention

The present invention relates to a combination tool which enables a mechanic and even a layman to accurately and quickly obtain four measurements of the bolt patterns of a vehicle's axle studs and any wheel rim's bolt holes in the linear English system and metric system units. This information would enable a mechanic or layman to obtain accurate measurements for quickly identifying the proper replacement wheel axle or wheel rim. A further advantage is to readily determine whether the bolt and rim hole patterns are symmetrical.

2. Description of the Related Art

The cost of vehicle parts has increased greatly and requires purchasers of replacement parts to seek out salvage yards for parts such as wheel rims and wheel axles. The problem is created when these parts are separated from the specific vehicles. The purchaser and the parts supplier have a need to identify the proper replacement wheel rim or wheel axle in a minimum of time with accuracy. The prior art has gauges which serve this need, but are limited to either wheel rims or wheel axles, and are not capable of serving both needs. A glaring defect is the lack of a third reference point which is diametrical from which to measure the spacing of the bolts, bolt holes and/or the diameter of the circle encompassed by the bolts and bolt holes.

The following pertinent prior art references will be discussed in the order of perceived relevance to the present invention.

U.S. Pat. No. 5,174,032 issued on Dec. 29, 1992, to George W. Beck describes a universal wheel gauge for measuring the spacing and configuration of the variable 4–8 lug holes of a vehicle wheel. The gauge is a round flat disc having a first series of three slots extending radially and equiangularly positioned. In each slot a wing nut bolt is mounted inside the wheel's center hole to provide the diameter of the center hole. A second series of three slots are provided, wherein two slots are connected and spaced radially but irregularly. Two wing nut bolts mounted in these slots provide the location of one lug hole relative to the center of the wheel and the location of a second lug hole opposite to the first lug hole. An elongated radial slot is provided as a ruler with markings for metric and English units. However, there is no provision for measuring three lug holes at one time and for measuring axle studs.

U.S. Pat. No. 4,129,950 issued on Dec. 19, 1978, to Theodore Weinhaus describes a combination wheel gauge tool to measure a wheel's hub opening, a bolt circle diameter and a rim diameter. The hub opening indicator has a base plate under which is mounted stepped elements in decreasing diameter, marked with indicia which is selectively inserted into a hub opening for measurement. A sliding element mounted on one side and on the upper surface of the base plate has a transverse plunger insertable into a bolt hole. The rim indicator has a movable element mounted on the opposite side on the base plate and is movable to engage the edge of the wheel rim. Only one bolt hole is utilized as a reference point and the bolt hole indicator is adjustable only in an axial direction.

U.S. Pat. No. 4,730,399 issued on Mar. 15, 1988, to Russ Campbell describes a wheel bolt circle gauge which includes a pair of movable projections to measure the distance between the holes and to register the distance on indicia inscribed on the gauge which can be interpreted to determine the maker of the vehicle on which the wheel would fit. The tool is in the form of a toothless pipe wrench with pointed jaws to insert in adjacent bolt holes. The lower jaw is movable and slides on the member supporting the upper jaw. The tool is a one-dimensional measuring device and not as accurate because only two reference holes are measured.

U.S. Pat. No. 5,101,569 issued on Apr. 7, 1992, to Michael O. Watkins describes an adjustable wheel measuring gauge capable of measuring multiple wheel measurements for identifying wheels. The gauge includes an elongated ruler with a first mating lug and a slider with a second mating lug. The ruler has measuring scales in millimeters and inches. The lug at one end is fixed at a zero position on the linear scale and inserted in one wheel hole while the other sliding lug with a window portion is inserted in the adjacent hole. The measurements must be read off the ruler's scales. This tool is deficient in measuring only bolt holes and the distance between two adjacent holes without reference to a third hole.

U.S. Pat. No. 3,361,482 issued on Jan. 2, 1968, to Harold E. Stevens describes an adapter plate for selective mounting to a trailer axle to accommodate the mounting of a spare tire. Multiple sets of apertures, suitable for receiving bolts to secure the spare tire's rim thereto, are provided at mutually different radial distances to accommodate a variety of lug hole patterns of the rim. Recesses are provided in the adapter plate to receive the securement bolts and to prevent the bolt heads from rotating. The device is distinguishable for failing to include slots following the bolt array pattern as in the present invention.

None of the above inventions and patents, taken either singly or in combination, is seen to describe the instant invention as claimed.

SUMMARY OF THE INVENTION

Accordingly, it is a principal object of the invention to provide a combination tool which measures the bolt patterns of wheel rims and axles.

It is a another object of the invention to provide a tool which measures the circular bolt diameter of a wheel rim with a minimum of manipulation of the measuring tool.

Still another object of the invention is to provide a tool which measures the circular hole diameter of a wheel rim with a minimum of manipulation of the measuring tool.

It is a further object of the invention to provide a tool which measures in linear British system and metric system units.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a combination tool which performs the dual function of measuring the circular bolt patterns of either a wheel axle or a wheel rim of vehicles produced by any country. The tool can obtain linear measurements in either the British system or the metric system in a matter of seconds. The circular bolt hole pattern of a wheel rim is measured by the first plate and a predetermined scale exposed. The circular bolt pattern of the wheel axle plate is measured by reversing the tool and exposing the second plate. This tool advantageously measures the distances between two adjoining bolts or bolt holes and between a third bolt or bolt hole substantially diametrically located from either of the first and second bolts or bolt holes.

Figure 1:
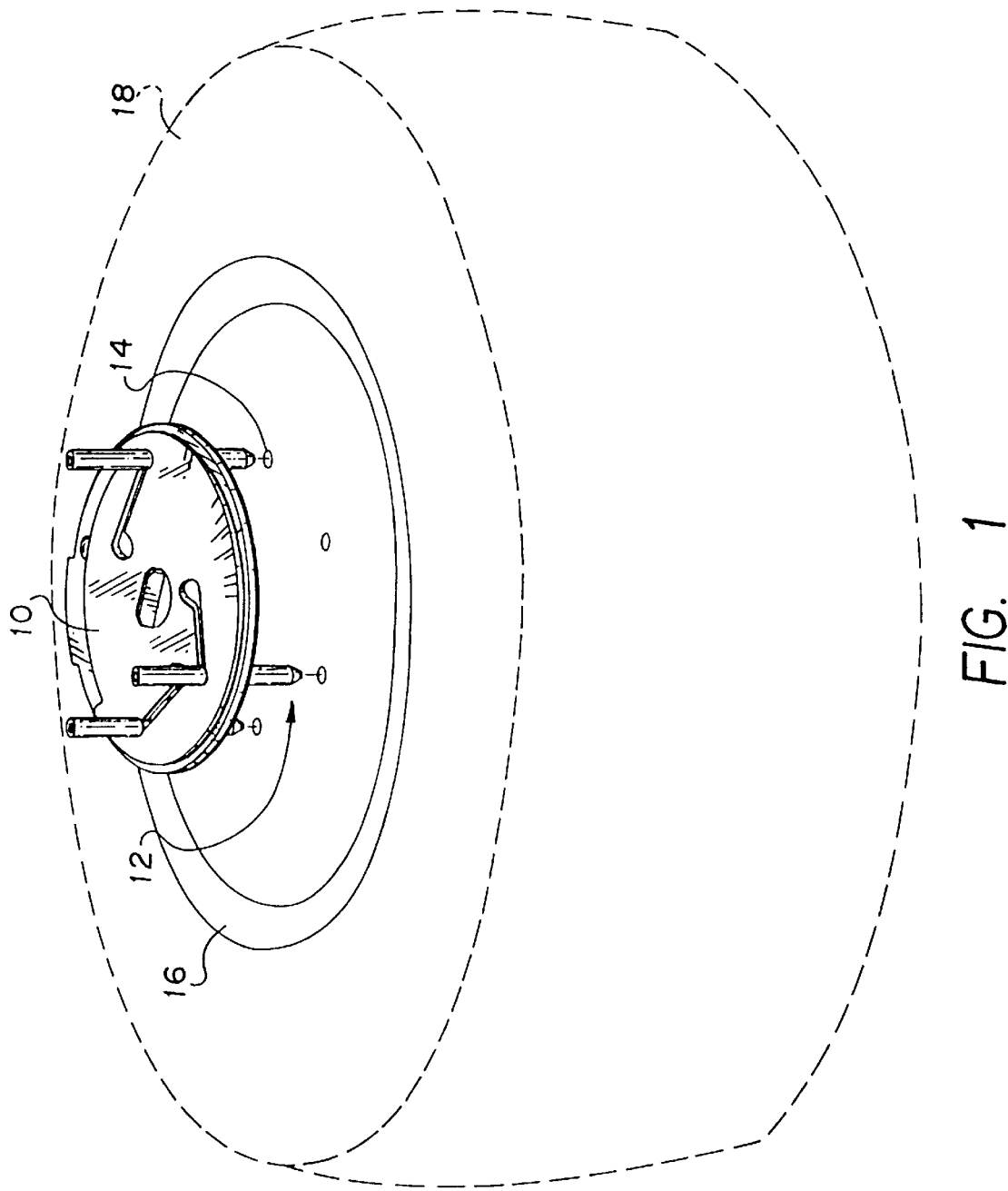
FIG 1 is an environmental perspective view of the device positioned to measure the circular bolt diameter of a mounted tire in dashed lines on a wheel.

In FIG. 1, the combination bolt and bolt hole circle pattern measuring device 10 is measuring the diameter of the circular bolt hole pattern 12 of five bolt holes 14 of a tire or wheel rim 16 having a tire or wheel 18 in dashed lines mounted on it.

Figure 2:
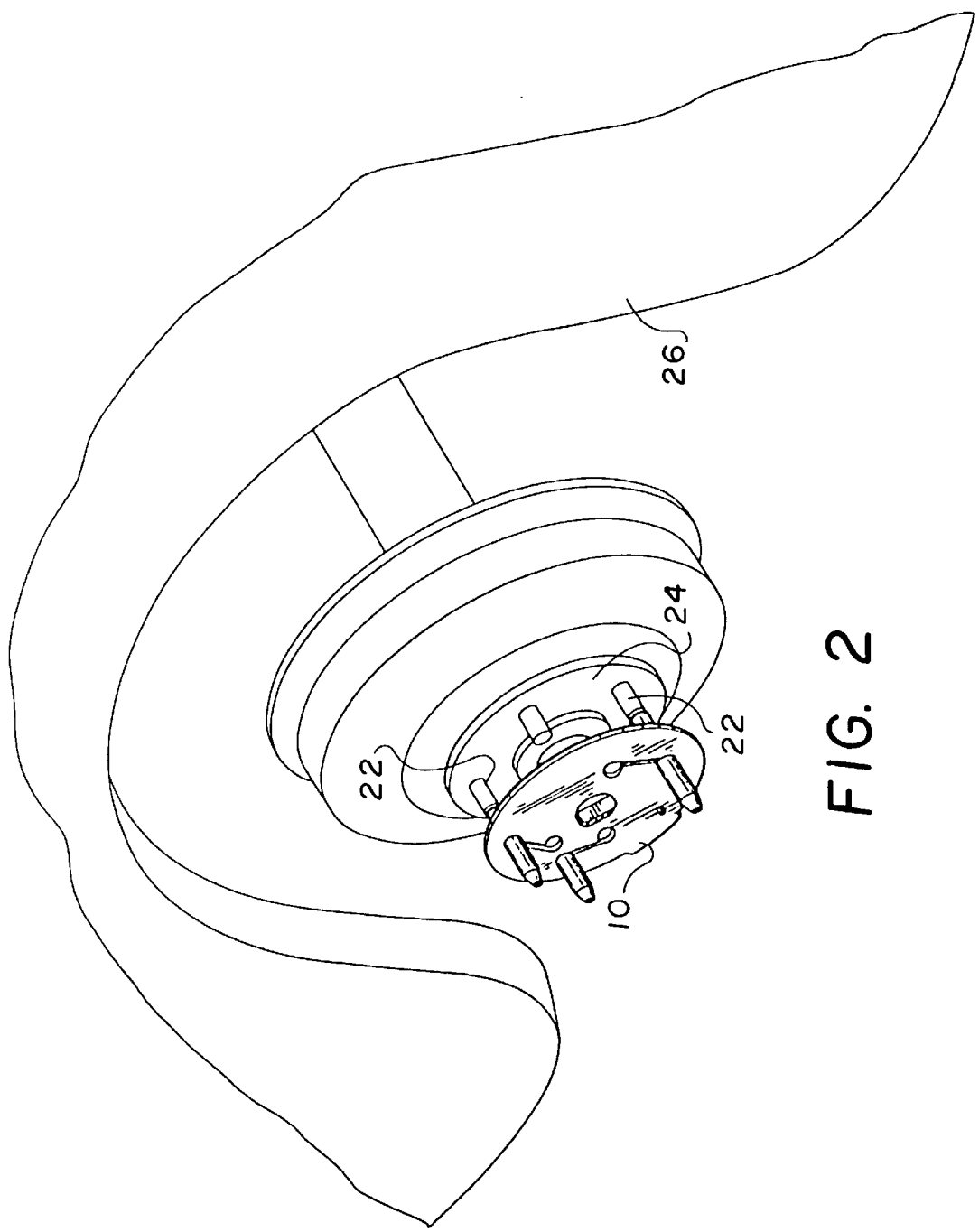
FIG. 2 is an environmental perspective view of device positioned to measure the circular bolt diameter of the wheel axle, with a partial view of an automobile fender.

In FIG. 2, the combination bolt and bolt hole circle pattern device 10 has been reversed, and device 10 is measuring the diameter of the circular bolt pattern 20 of bolts or studs 22 of an axle plate 24 of a vehicle 26 partially shown.

Figure 3:
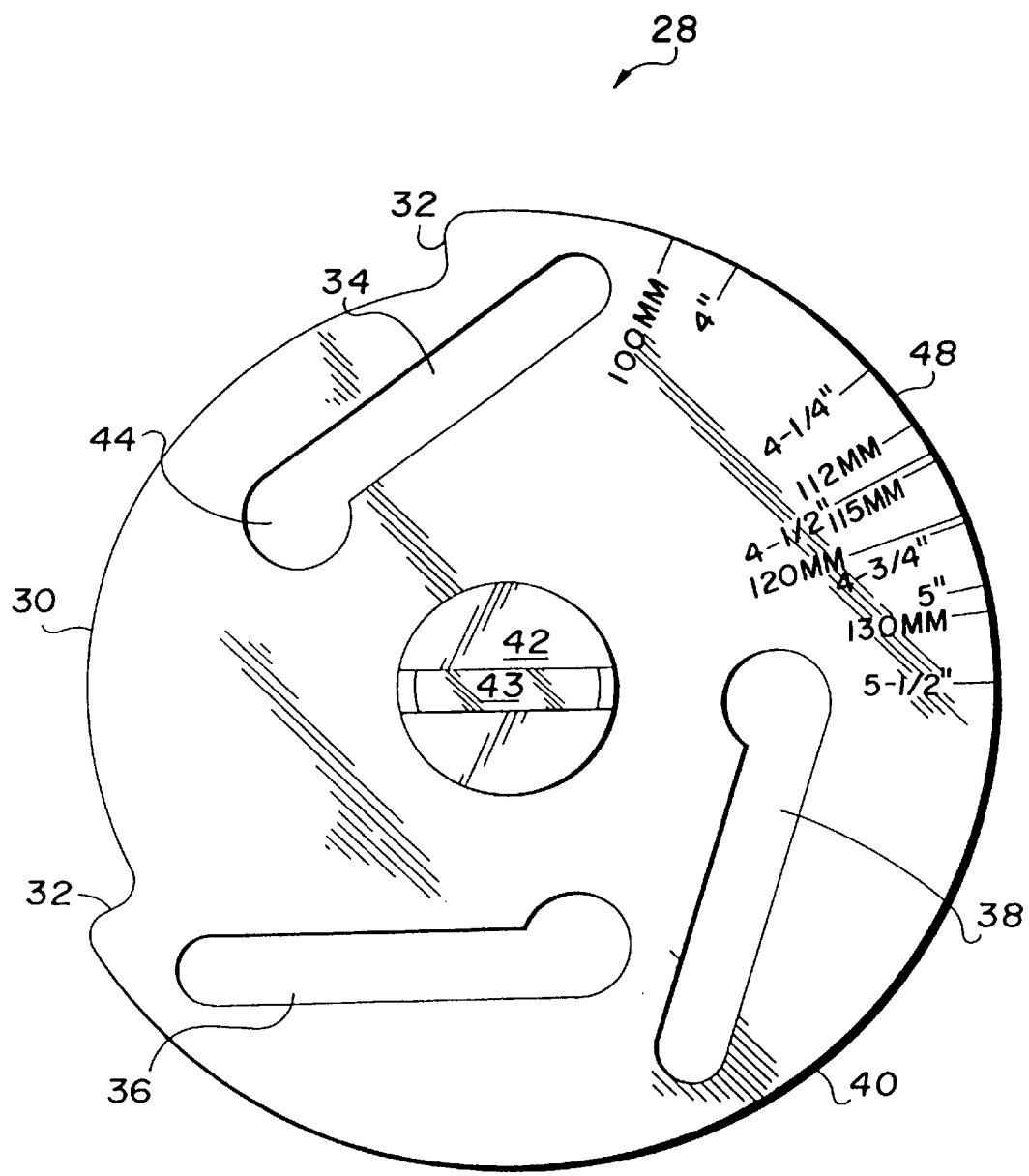
FIG. 3 is a top view of the first plate of the device.

FIG. 3 shows the isolated first plate 28 of the device 10 which is substantially circular in configuration except for an indentation 30, which ends 32 thereof, act as stops to be explained in the description of the other plate. First plate 28 has three slots 34, 36 and 38, wherein 34 is located proximate to the indentation 30 and is opposite the paired slots 36 and 38. Each slot 34, 36 and 38 is arranged from proximate the edge 40 towards the center and knob 42. Knob 42 has a grippable ridge 43 and is affixed to the first plate 28, but the unitary knob rotates in the second plate 50. Each slot has an enlarged aperture 44 which has a diameter slightly larger than the diameter of peg 46 which will be later inserted. Apertures 44 of the slots are proximate to the knob 42 and are described as heads of the slots. The remaining slender portions of the slots will be described as tails. The paired slots 36 and 38 are seen arranged head to tail. The same general relationship occurs with the head of slot 34 with reference to the tail of slot 36 and the head of slot 38 with reference to the tail of slot 34, except that the distances between the respective heads and tails are much greater.

A scale 48 has been predetermined by calibration with various standardized bolt and bolt hole circle patterns as shown on an edge 40 of the first plate 20 in FIG. 3. For example, a 4½ inch mark for a bolt circle diameter can still be distinguished from the 115 mm. mark of another wheel rim or axle.

Figure 4:
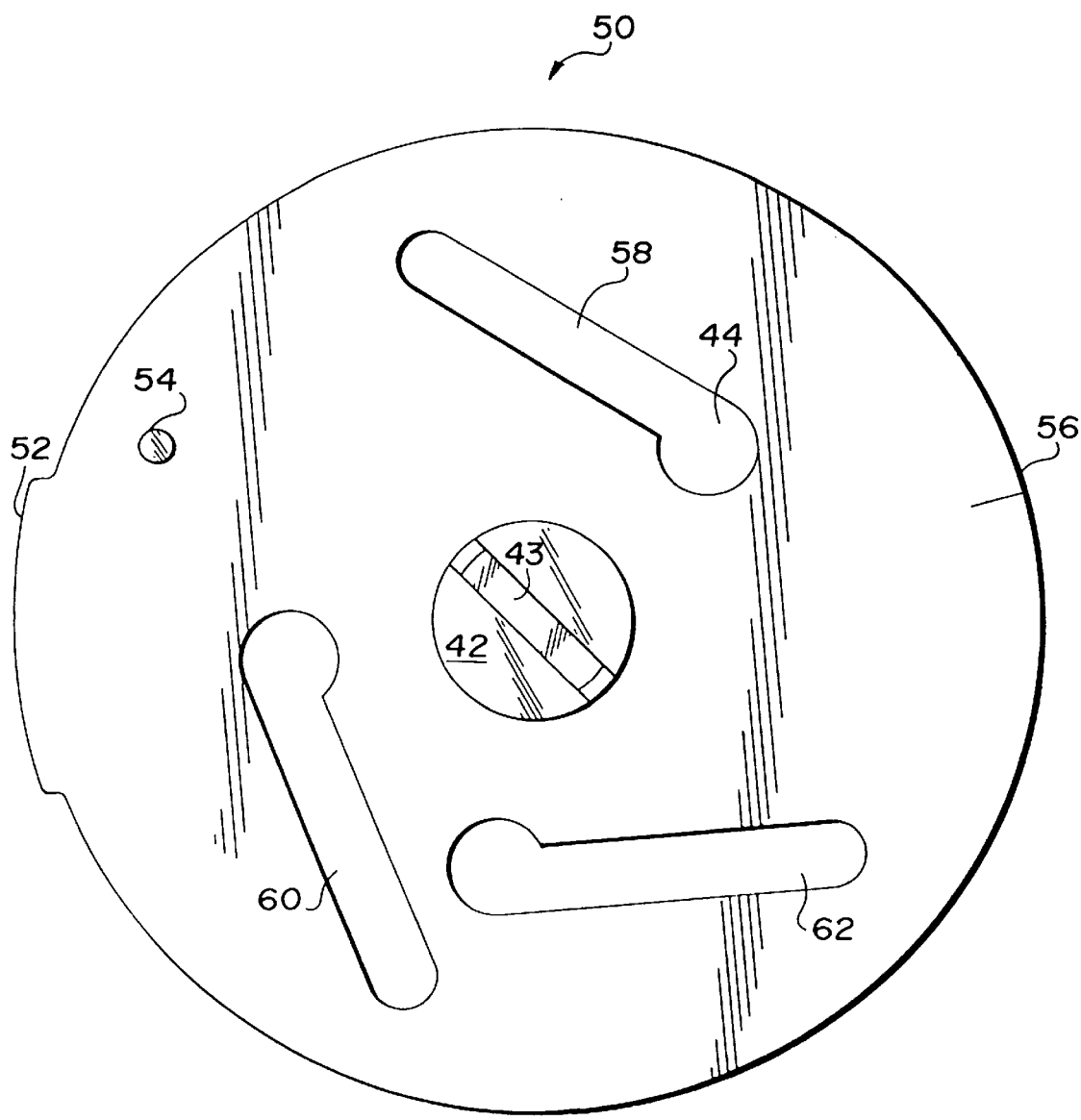
FIG. 4 is a top view of the second plate of the device.

FIG. 4 shows the second plate 50 with a tab portion 52, a stop button 54, a knob 42 with a grippable ridge 43, and an index mark 56. The second plate 50 is greater in diameter overall than the first plate 28 in order to align the index mark 56 with the scale 48, and to permit the user to hold the tab portion 52 more securely during use. The slots 58, 60 and 62 in the second plate 50 are inclined in the opposite direction from that of slots 34, 36 and 38, respectively, of the first plate 28. The corresponding slots of the plates intersect along most of the length of a slot. The pegs 46 are confined in the slots of both plates as the plates are rotated counter to each other due to the orientation of the slots in the opposing plates.

Figure 5:
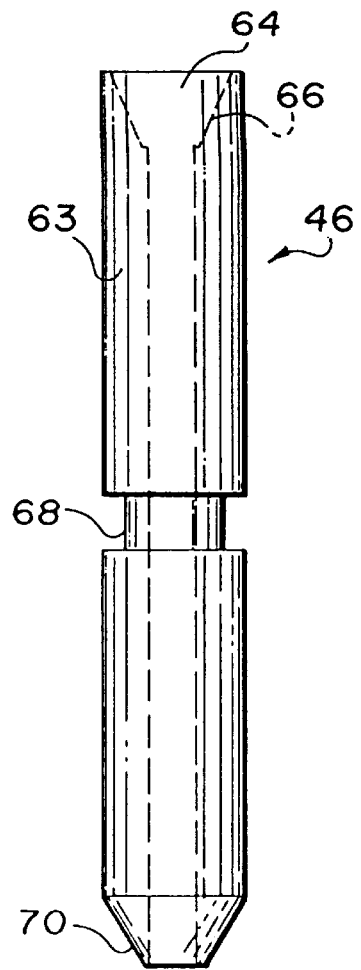
FIG. 5 is a side view of a peg.

FIG. 5 illustrates a round peg 46 having a throughbore 63. At one end, a concave end 64 is formed with sides 66 inclined 60° from the vertical or longitudinal axis. The concave end 64 is utilized for holding a bolt 22 in measuring the bolt circle pattern 12 diameter. In the middle of peg 46 a reduced neck portion 68 is required for sliding, the peg along the slots of the two plates. At the other end a frustoconical portion 70 having a tapered angle of 60° measured from the longitudinal axis is utilized for measuring the bolt holes 14. The enlarged apertures 44 of two corresponding slots of the two plates in FIGS. 3 and 4 are aligned one at a time to insert a peg 46. Once the pegs 46 are installed, the stop button 54 in FIG. 3 can be installed to limit the range of counter-rotation of the first plate 28 and its scale 48 relative to the index mark 56 on the second plate 50.

Figure 6:
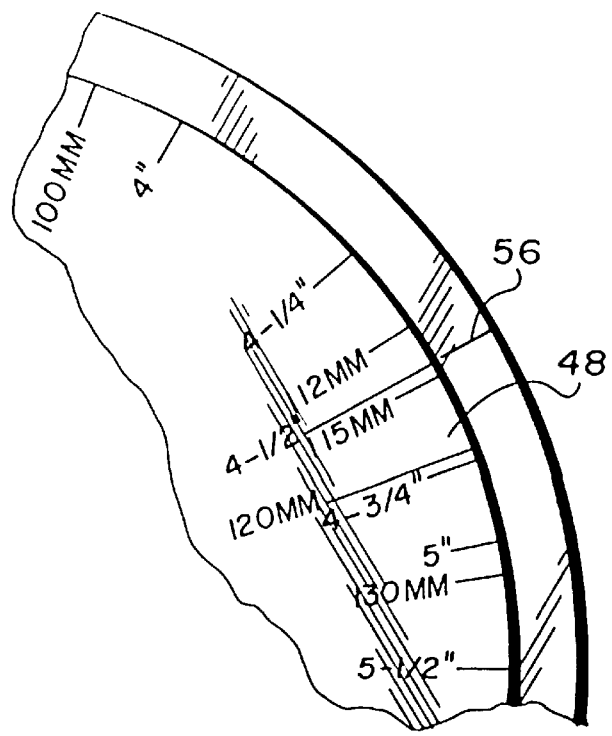
FIG. 6 is a partial top view of the scale portion of the device.

FIG. 6 is an enlarged view of the scale 48 and the index mark 56 set at a bolt circle diameter 4½ in. Other S.A.E. and metric bolt circle diameter sizes are shown.

The method of using the device 10 for measuring the diameter of the bolt hole circle of a tire or wheel rim 16 as illustrated in FIG. 1 consists of simply aligning the paired pegs 46 with the concave ends 64 inserted in adjoining bolt holes 14 and the third peg 46 inserted within a third bolt hole 14. Another advantage would be to move along the circle of bolt holes to test the symmetry of the bolt circle. The scale 48 will readily give the exact bolt circle diameter for the tire or wheel rim in either S.A.E. (British system) or metric units.

Then, as illustrated in FIG. 2, the device 10 can be turned over to measure the diameter of the circular bolt or stud pattern 20 of the wheel axle plate 24 by inserting the concave ends 64 of the pegs 46 over the axle studs or bolts 22 by adjusting the knob 42. Since the scale 48 is underneath in this instance, the device 10 must be reversed to read the measurement. Again, the device can be utilized to move along the bolt circle to test its symmetry.

Exemplary dimensions and suitable compositions of the device 10 are as follows:

Every part can be made from either high density polyethylene or polyvinylchloride, but can differ in color.

First plate 28: White; 3/16 in. thick; 6¾ in. diameter.

Second plate 50: White; ⅛ in. thick; 7½ in. diameter.

Slots 34, 36, 38, 58, 60, 62: 3¼ in. long; aperture (head) 44, ¾ in. diameter; tail, ½ in. wide.

Knob 42: Red; 1½ in. diameter; 1¼ in. overall length; height of ridges 43, ½ in.; width of ridges 43, ⅜ in.

Pegs 46: Black; three pegs; 4½ in. long; notch diameter ½ in.; throughbore 63, ¼ in. diameter.

Indentation 30: ½ in. deep; extending 120°.

Tab 52: 2½ in. length; ¼ in. width.

This device 10 is suitable only for five bolt patterns. If 4, 6 and 8 bolt patterns are desired, another unit utilizing only two pegs can be substituted with corresponding slots and scales to measure all three bolt patterns.

It is to be understood that the present invention is not limited to the embodiments described above, but encompasses any and all embodiments within the scope of the following claims.

We claim:

1. A combination tool for measuring the bolt patterns of wheel rims and axles comprising:
 a first circular plate having three slots arranged from proximate its outside edge to incline towards its center, wherein two slots are positioned head to tail, said first plate having a scale indicia on a portion of the edge;
 a second circular plate of larger diameter having three slots arranged in a pattern of two slots positioned head to toe, wherein all three slots incline toward the center in a direction opposite to that of the three slots in the upper plate, and each corresponding slot of each plate intersect;
 said second circular plate having a single indicia mark on an edge which aligns within said scale indicia on the upper plate for a predetermined circular bolt pattern size;
 a peg having a circular notch in a central portion and positioned vertically and slidably in each of the three intersecting points of both first and second plates, whereby the first and second plates are held snugly together and rotate in opposite directions;
 each peg portion extending from the first plate having a countersunk end, whereby said countersunk end can be placed on a axle bolt;
 each peg portion extending from the second plate having a tapered end, whereby said tapered end can be placed in a bolt hole of a wheel rim; and
 a first knob attached to the first plate, intersecting the bottom plate, and integral with a second knob, which permits rotation of the second plate; whereby
 a user can measure the wheel axle bolt pattern with the first plate and scale exposed, and reverse the device to measure the wheel rim bolt pattern for proper alignment and diagnosis with the second plate exposed.

2. The combination tool according to claim 1, including an indented portion in the edge of the first plate with the smaller diameter, the second plate having a stop means, said indented portion cooperating with said stop means on the second plate.

3. The combination tool according to claim 1, including a tab portion on the second plate for a gripping means.

4. The combination tool according to claim 1, wherein said scale indicia on said first plate being measurements in S.A.E. and metric units.

5. The combination tool according to claim 1, including the use of the combination tool for measuring 5 bolt patterns of wheel rims and axles.

6. The combination tool according to claim 1, including an additional peg for measuring bolt patterns selected from the group consisting of 4, 6 and 8 bolt patterns.

7. The combination tool according to claim 1, including every part made from a plastic material selected from the group consisting of high density polyethylene and polyvinylchloride.

8. The combination tool according to claim 1, wherein the plates, the knob, and the pegs being identifiable with different colors.

* * * * *